May 4, 1926.
P. WILLIAMS
AUTOMOBILE BUMPER
Filed August 10, 1925
1,583,636
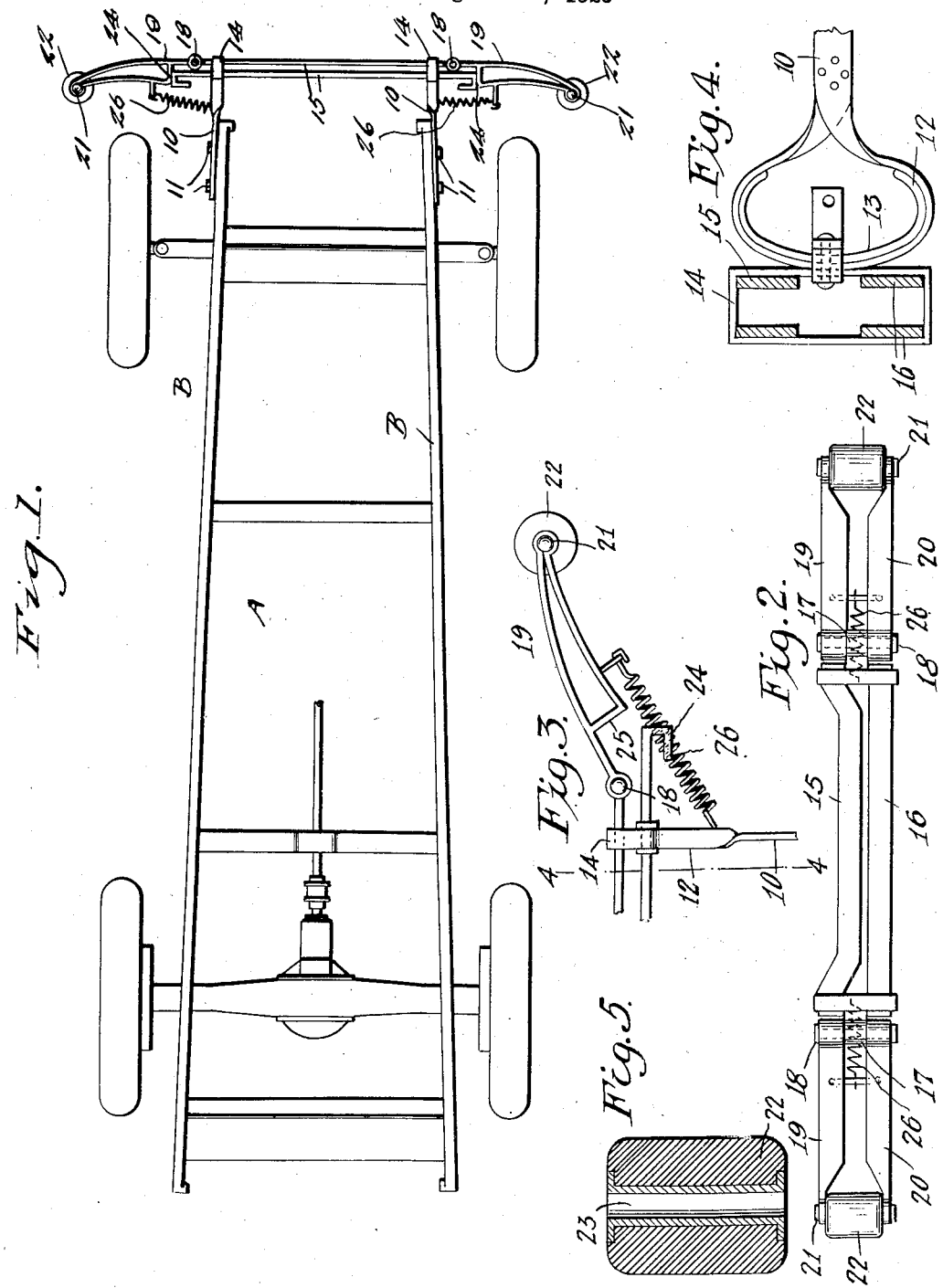
Paul Williams INVENTOR
BY Victor J. Evans ATTORNEY Patented May 4, 1926.

1,583,636

UNITED STATES PATENT OFFICE.

PAUL WILLIAMS, OF LOS ANGELES, CALIFORNIA.

AUTOMOBILE BUMPER.

Application filed August 10, 1925. Serial No. 49,438.

*To all whom it may concern:*

Be it known that I, PAUL WILLIAMS, a citizen of the United States, residing at Los Angeles, in the county of Los Angeles and State of California, have invented new and useful Improvements in Automobile Bumpers, of which the following is a specification.

This invention relates to attachments to or accessories for use in connection with automobiles and the like and has for its object the provision of a novel bumper structure for mountitng upon the front of the vehicle for the purpose of affording a certain amount of protection in case of minor collisions.

An important object is the provision of a bumper structure provided at its ends with journally mounted resilient rollers which will act to guide the vehicle in case it strikes gently against a wall or other vehicle, the resilience of the rollers tending to prevent serious damage to any surface contacted by the bumper.

Another object is the provision of a bumper which has its end portions hingedly mounted so that in case of backing and catching the bumper in the bumper or fender of a nearby car or other object the end may swing and prevent injury to the bumper or to the object struck thereby.

An additional object is the provision of a bumper which will be simple and inexpensive in manufacture, easy to install, positive in action, efficient and durable in service, and a general improvement in the art.

With the above and other objects and advantages in view, the invention consists in the details of construction and the arrangement and combination of parts to be hereinafter more fully described and claimed, and illustrated in the accompanying drawings, in which:—

Figure 1 is a plan view of an automobile chassis equipped at its front with a bumper constructed in accordance with my invention.

Figure 2 is an elevation of the front bumper.

Figure 3 is an enlarged plan view showing one end of the bumper with the end portion swung away.

Figure 4 is a detail cross section taken on the line 4—4 of Figure 3.

Figure 5 is a detail view taken through one of the rollers.

Referring more particularly to the drawings, the letter A designates a chassis of a motor vehicle including the usual longitudinally extending frame bars B. Other features such as wheels, drive shaft and the like are illustrated but are not referred to specifically inasmuch as they form no part of the present invention.

In carrying out the invention, I provide a pair of forwardly extending bracket arms 10 which are bolted or otherwise suitably secured upon the forward ends of the frame bars B as indicated at 11. These bracket arms 10 may conveniently be each formed from a single length of resilient metal of strip-like form bent into the shape disclosed in Figure 4 to provide a frame-like or loop-like portion 12 which may be reinforced by means of a leaf spring 13 mounted therein and held thereto in any desired manner.

Secured to each of the loop members 12 at the forward ends of the bracket arms 10 are loops or frame members 14 within which are mounted pairs of upper and lower bars 15 and 16 respectively which may be formed separately or integrally as preferred and which are preferably of spring steel. The front bar terminates in hinge knuckles 17 upon which are pivoted at 18 arms 19 which are curved as shown and which have their outer ends separated or spaced at 20. Journaled at 21 within these spaced outer ends are rollers 22 of rubber or other similar material, these rollers being naturally bushed as indicated at 23 in order to be properly supported by the pivot bolts therefor. The bars 15 and 16 are arranged in pairs as shown and the pivot points 18 are at the ends of the forward bars, the rear bars terminating in reversely extended portions constituting shoulders 24 engageable by shoulder portions 25 on the arms 19 for the purpose of limiting rearward swinging movement thereof under the influence of coil springs 26.

Obviously, in case the bumper strikes against another vehicle or against the wall of a garage, fence or the like, it is quite clear that the rubber rollers 22 at the ends will act to cushion whatever slight shock there may be and also guide the vehicle along instead of an excessive and abrupt strain coming upon it or upon the bumper. Furthermore, it will be observed that in case of backing when the bumper might hook into the bumper or fender of an adjacent car the arms 19 at the ends may swing forwardly as indicated in Figure 3 and permit disengagement instead of the parts hanging together and causing trouble as is the case with the ordinary type of bumper.

From the foregoing description and a study of the drawings, it will be apparent that I have thus provided a simply constructed, inexpensive and easily installed bumper structure which when in applied position at the front of the vehicle will operate most satisfactorily for protecting the vehicle against damage. It is believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, I claim:

1. A vehicle bumper structure comprising a pair of spring supporting arms adapted to be mounted upon the forward end of the frame bars of a vehicle chassis, supporting members carried by said arms, forward and rear bars mounted within said supporting members, and rearwardly spring pressed end members pivoted upon the forward bar and engageable with the ends of the rear bar.

2. A vehicle bumper structure comprising a pair of spring supporting arms adapted to be mounted upon the forward end of the frame bars of a vehicle chassis, supporting members carried by said arms, forward and rear bars mounted within said supporting members, and rearwardly spring pressed end members pivoted upon the forward bar and engageable with the ends of the rear bar, and resilient rollers journally mounted in vertical position upon the ends of said pivoted arms.

3. A vehicle bumper structure comprising supporting arms, frame like supporting members carried by said arms, forward and rear bars mounted within said frame like supporting members, the forward bar terminating at its ends in knuckles, end arm members pivotally connected with said knuckles, and coacting means on said pivoted arms and the ends of the rear bar for limiting rearward swinging movement of the end arms, and springs connected with said pivoted arms for urging them rearwardly.

In testimony whereof I affix my signature

PAUL WILLIAMS.